United States Patent
Matsuno et al.

(10) Patent No.: US 6,932,180 B2
(45) Date of Patent: Aug. 23, 2005

(54) DIFFERENTIAL LIMITING CONTROL APPARATUS FOR VEHICLE

(75) Inventors: Koji Matsuno, Tokyo (JP); Hideharu Tatsumi, Tokyo (JP); Atsushi Fukuda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/690,988

(22) Filed: Oct. 23, 2003

(65) Prior Publication Data

US 2004/0129476 A1 Jul. 8, 2004

(30) Foreign Application Priority Data

Oct. 25, 2002 (JP) .................................. P. 2002-311568

(51) Int. Cl.⁷ .............................................. F16H 59/60
(52) U.S. Cl. .................................... 180/248; 477/81
(58) Field of Search .............................. 180/242, 243, 180/247, 248, 249; 477/80, 81, 86; 192/32

(56) References Cited

U.S. PATENT DOCUMENTS

| | | | | |
|---|---|---|---|---|
| 3,580,350 A | * | 5/1971 | Arkus-Duntov | 180/248 |
| 4,887,686 A | * | 12/1989 | Takei et al. | 180/211 |
| 6,401,854 B2 | * | 6/2002 | Yano et al. | 180/242 |
| 6,428,447 B2 | * | 8/2002 | Onuki | 477/99 |
| 6,524,221 B2 | * | 2/2003 | Nishimura | 477/97 |
| 6,536,569 B2 | * | 3/2003 | Nishimura | 192/3.58 |
| 6,607,060 B2 | * | 8/2003 | Inoue | 192/83 |

FOREIGN PATENT DOCUMENTS

JP          8-132914          5/1996

* cited by examiner

*Primary Examiner*—Avraham Lerner
(74) *Attorney, Agent, or Firm*—McGinn & Gibb PLLC

(57) ABSTRACT

A mode establishing section of a differential limiting control apparatus for a four wheel drive vehicle commands an automatic mode control section or a manual mode control section to output calculated clutch torques according to a signal from a mode switch operated by a driver. In an initial condition of an ignition switch turned on, the execution command is issued to the automatic mode control section, until the driver newly selects the manual mode through the mode switch. Further, when the vehicle travels at a speed higher than a preestablished threshold value, the execution command is outputted to the automatic mode control section, irrespective of the signal from the mode switch.

17 Claims, 5 Drawing Sheets

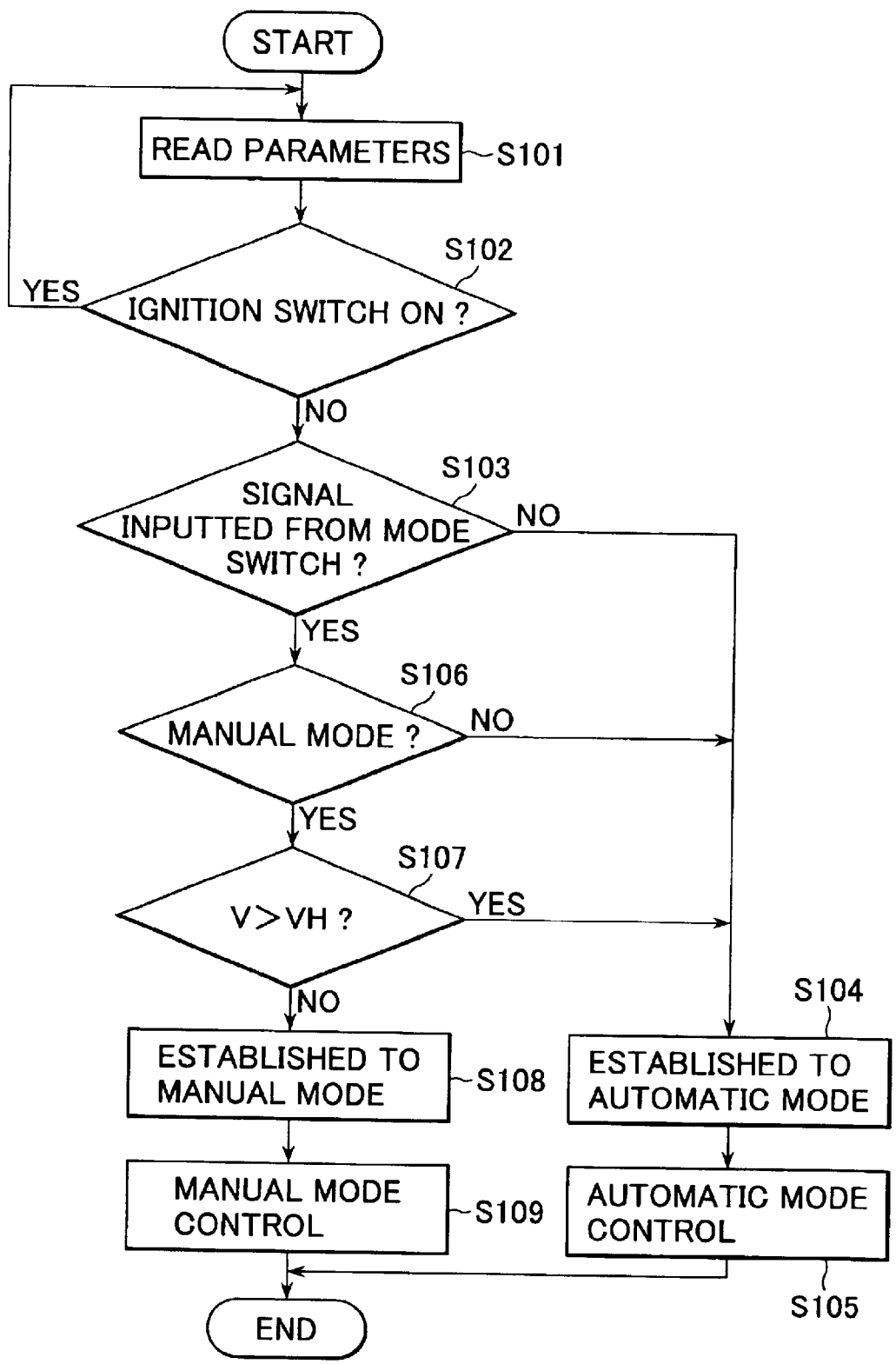

DIFFERENTIAL LIMITING CONTROL APPARATUS FOR VEHICLE

BACKGROUND OF THE INVENTION

1. Field of the Invention

The present invention relates to a differential limiting control apparatus provided in a center differential of a four wheel drive vehicle for performing a differential limiting control between a front drive shaft on the front wheel side and a rear drive shaft on the rear wheel side.

2. Discussion of Related Arts

In general, many of power transmission controls such as front-rear wheels power distribution controls or front-rear/left-right wheels differential limiting controls, variably control the clutch engagement force by a multiple disc clutch and the like. With respect to the differential limiting control in which the clutch engagement force is variably controlled, the vehicle driving performance is largely dependant on the control characteristics of the differential limiting control. Further, the vehicle driving performance varies according to tires or road surface conditions with the same control logics and control constants. Further, the required vehicle driving performance differs with an individual driver or with driving conditions.

Hence, Japanese Patent Application Laid-open Toku-Kai-Hei 8-132914 discloses a technology of a front-rear wheels torque distribution control apparatus in which a driver establishes a differential limiting torque by the manual operation to obtain a desired torque distribution condition.

In order to realize the driving performance of the vehicle as a driver desires, however, it is necessary to variably control the differential limiting torque according to a variety of driving conditions or road surface conditions. Therefore, it is difficult to adjust the differential limiting torque to a target value and to realize the most suitable driving performance of the vehicle merely by establishing the differential limiting torque directly by the manual operation of the driver, as proposed in Toku-Kai-Hei 8-132914. Further, in case where the driver manually operates the differential limiting torque control apparatus and drives the vehicle, for example, in a released condition of the differential limiting clutch as the driver intends, in an extreme case, a spin may occur to the vehicle on a road surface with low friction coefficient. Reversely, in case where the driver manually operates the differential limiting torque to drive the vehicle in an engaged condition of the differential limiting clutch for a long time, sometimes wrong loads such as an internal circulation torque occurs to the powertrain of the vehicle. Further, such wrong loads may exacerbate fuel economy.

SUMMARY OF THE INVENTION

It is an object of the invention to provide a differential limiting control apparatus capable of realizing a natural driving performance of a vehicle suitable for driving conditions.

In order to attain the object, a differential limiting control apparatus for a four wheel drive vehicle having clutch means for variably transmitting a driving force to a front drive shaft and to a rear drive shaft, comprises automatic clutch control means for automatically calculating and establishing an engagement force of the clutch means according to traveling conditions of the vehicle, manual clutch control means for manually establishing the engagement force of the clutch means and control selecting means for selecting either of the automatic clutch control means and the manual clutch control means and for commanding the selected one to output the engagement force.

In an initial condition of an ignition switch turned on, the control selecting means command the automatic clutch control means to output the engagement force of the clutch means until the manual clutch control means is newly selected.

Further, when the vehicle travels at a higher speed than a threshold value, the control selecting means command the automatic clutch control means to output the engagement force of the clutch means.

BRIEF DESCRIPTION OF THE DRAWINGS

FIG. 6 is a flowchart of a front-rear wheels power distribution control program.

DETAILED DESCRIPTION OF THE PREFERRED EMBODIMENTS

Figure 1:
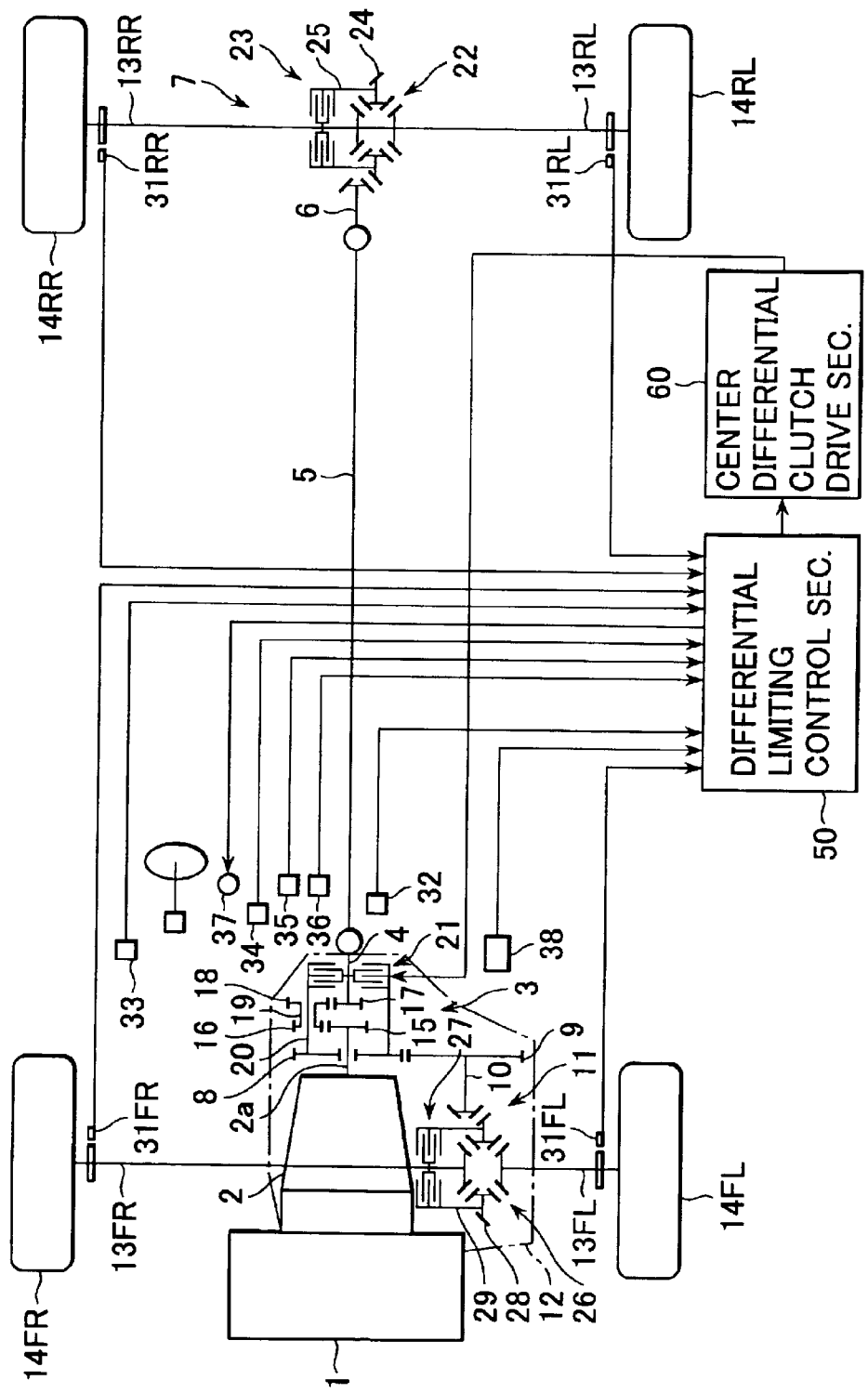
FIG. 1 is a schematic drawing showing a vehicle power train and a center differential incorporating a differential limiting control section.

Referring now to FIG. 1, reference numeral 1 denotes an engine mounted on a front part of a vehicle. Driving force of the engine 1 is transmitted to a center differential 3 through an automatic transmission 2 (including a torque converter) and a transmission output shaft 2a. Further, the driving force of the engine 1 inputs from the center differential 3 to a rear final reduction gear unit 7 through a rear drive shaft 4, a propeller shaft 5 and a drive pinion 6 and on the other hand the driving force inputs from the center differential 3 to a front final reduction gear unit 11 through a transfer drive gear 8, a transfer driven gear 9 and a front drive shaft 10. The automatic transmission 2 is accommodated integrally with the center differential 3 and the front final reduction gear unit 11 in a casing 12.

The driving force inputted to the rear final reduction gear unit 7 is transmitted to a rear left wheel 14RL and a rear right wheel 14RR through a rear left drive shaft 13RL and a rear right drive shaft 13RR, respectively. Further, the driving force inputted to the front final reduction gear unit 11 is transmitted to a front left wheel 14FL and a front right wheel 14FR through a front left axle shaft 13FL and a front right axle shaft 13FR, respectively.

The center differential 3 incorporates a first sun gear 15 having a large diameter and mounted on the transmission output shaft 2a. The first sun gear 15 meshes with a first pinion 16 having a small diameter, thus a first gear train being constituted.

Further, a second sun gear 17 having a small diameter is mounted on the rear drive shaft 4 from which power is transmitted to rear wheels and meshes with a second pinion 18 having a large diameter, thus a second gear train being constituted.

The first pinion 16 and the second pinion 18 are integrally formed with a pinion member 19 which is rotatably supported by a fixed shaft provided in a carrier 20. Further, the carrier 20 is connected at the front thereof with the transfer drive gear 8 from which power is transmitted to the front wheels.

Further, the carrier 20 is rotatably fitted at the front section thereof over the output shaft 2a of the transmission 2 and is rotatably fitted at the rear section thereof over the rear drive shaft 4. Further, the first and second sun gears 15, 17 are accommodated in the central space of the carrier 20. In FIG. 1, only one pinion member 19 is illustrated, however in an actual construction, plural pinion members 19 are provided around the sun gears 15, 17.

Thus, the center differential 3 is formed as a compound planetary gear unit having an input member in the transmission shaft 2a, an output member in the rear drive shaft 4 and the other output member in the carrier 20.

The center differential 3 of a compound planetary type is provided with a differential function by properly establishing the number of teeth of the first and second sun gears 15, 17 and the first and second pinions 16, 18.

Further, the center differential 3 is furnished with a desired base torque distribution, for example an unequal torque distribution biased on rear wheels, by appropriately establishing working pitch circles of the first and second sun gears 15, 17 and the first and second pinions 16, 18.

Further, the center differential 3 is designed in such a manner that the first and second sun gears 15, 17 and the first and second pinions 16, 18 have helical teeth, respectively, leaving thrust loads. As a result, the thrust loads produce a friction torque at an end of the respective pinion members 19. Further, a resultant force of separation force and tangential force generated by meshing of the gears exerts on the fixed shaft provided in the carrier 20, producing another friction torque between the respective pinion members 19 and the respective fixed shafts. Since these friction torques are obtained as a differential limiting torque which is proportional to the input torque, a differential limiting function is given to the center differential 3 itself.

Further, there is provided a center differential clutch (transfer clutch) 21 of a hydraulic multiple disc clutch type for varying the front-rear torque distribution between two output members, the carrier 20 and the rear drive shaft 4, of the center differential 3. By controlling the engagement force of this transfer clutch 21, the front-rear torque distribution ratio can be varied from 50:50 in a fully engaged condition to an inherent front-rear torque distribution ratio, for example 35:65, of the center differential 3 in a released condition.

The transfer clutch 21 is connected with a center differential clutch drive section 60 constituted by a hydraulic circuit including a plurality of solenoid valves. Hydraulic pressure generated in the center differential clutch drive section 60 actuates a piston (not shown) to engage or release the transfer clutch 21. Further, control signals for driving the center differential clutch drive section 60, that is, input signals to the respective solenoid valves, are outputted from a differential limiting control section 50 which will be described hereinafter.

The rear final reduction gear unit 7 comprises a differential mechanism 22 using bevel gears and a rear differential clutch 23 using a multiple disc clutch. The rear differential clutch 23 is provided between a differential case 25 to which a ring gear 24 is fixed and a rear right axle shaft 13RR. The ring gear 24 meshes with the drive pinion 6 to drive the differential mechanism 22.

The front final reduction gear unit 11 is constituted by a differential mechanism 26 of bevel gear type and a front disc clutch 27 using multiple discs in the same manner as the rear final reduction gear unit 7. The front disc clutch 27 is provided between a differential case 29 to which a ring gear 28 is fixed and a front right axle shaft 13FR. The ring gear 28 meshes with a drive pinion of the front drive shaft 10 to drive the differential mechanism 26.

The differential limiting control section 50 inputs parameters necessary for controls from respective sensors and switches. Wheel speeds of the wheels, 14FL, 14FR, 14RL and 14RR are detected by wheel speed sensors 31FL, 31FR, 31RL and 31RR, respectively and are inputted to the differential limiting control section 50. Further, the differential limiting control section 50 inputs a lateral acceleration Gy applied to the vehicle from a lateral acceleration sensor 32. Also, the differential limiting control section 50 inputs ON-OFF signals from a brake switch 33 provided in the vehicle. The brake switch 33 outputs a turned-on signal when a brake pedal (not shown) is depressed and a turned-off signal when the brake pedal is eased up. Further, the differential limiting control section 50 inputs ON-OFF signals from an ignition switch 34. The vehicle incorporates a mode switch 35 for selecting an automatic mode in which the front-rear power distribution control is performed automatically according to the driving conditions of the vehicle or a manual mode in which the front-rear power distribution control is performed manually according to a driver's intention and the differential limiting control section 50 inputs the selection signal from the mode switch 35. When the driver selects the manual mode, the engagement condition of the transfer clutch 21 is freely selected from a released condition to a fully engaged condition by the driver's operation of a characteristic changing dial 36. Further, the mode presently selected is indicated by a mode indicator lamp 37 provided on the instrument panel. Further, the vehicle incorporates a known antilock braking system (ABS) for preventing wheel locks on applying brakes and an operation signal of the ABS is outputted from an ABS control apparatus 38 to the differential limiting control section 50.

Figure 2:
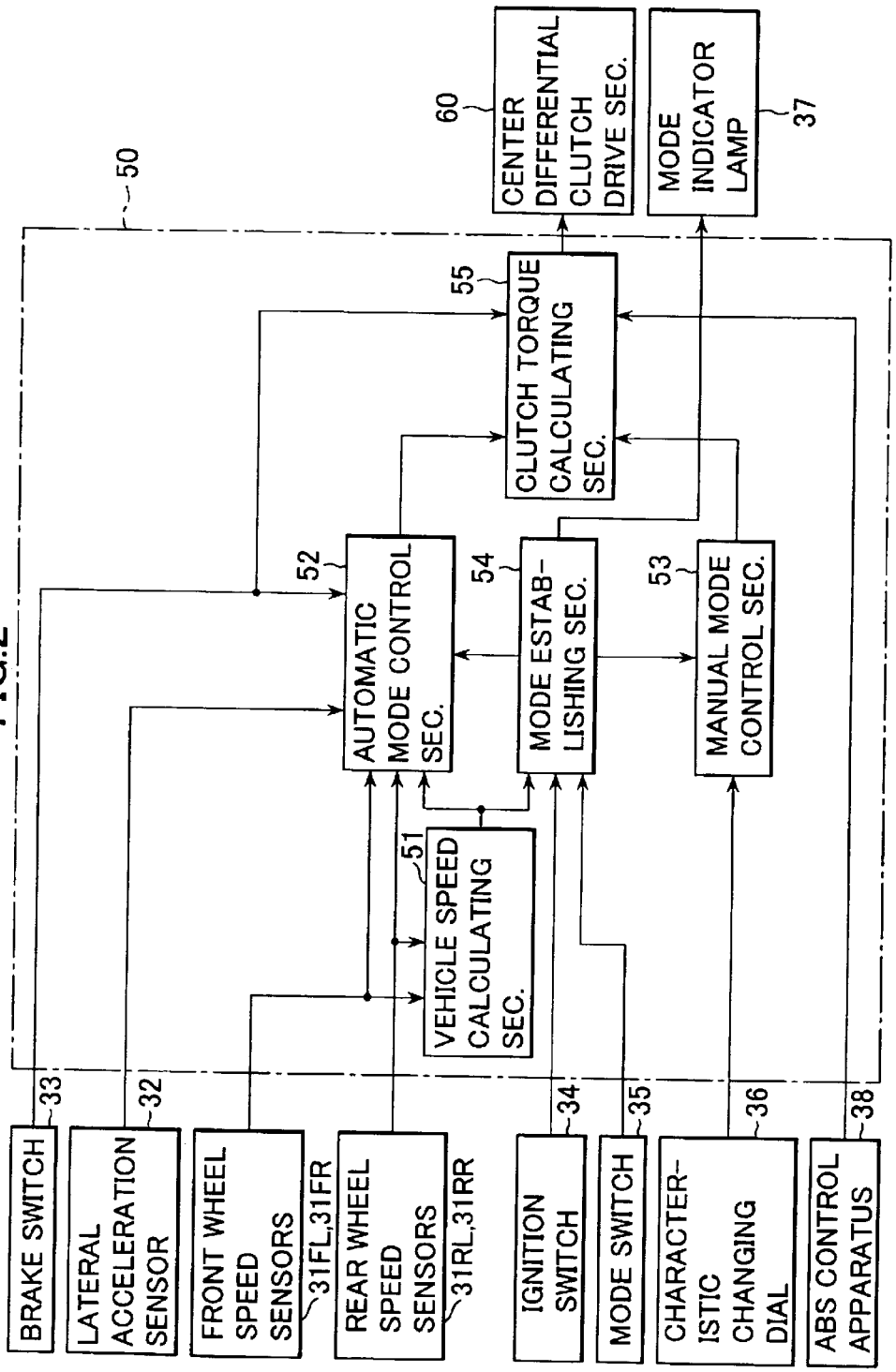
FIG. 2 is a functional block diagram of the differential limiting control section.

The differential limiting control section 50 is constituted by a micro-computer and peripheral circuits, specifically, as shown in FIG. 2, constituted by a vehicle speed calculating section 51, an automatic mode control section 52, a manual mode control section 53, a mode establishing section 54 and a clutch torque calculating section 55.

The vehicle speed calculating section 51 inputs wheel speeds ωfl, ωfr, ωrl, ωrr of the wheels 14FL, 14FR, 14RL, 14RR from the wheel speed sensors 31FL, 31FR, 31RL, 31RR, respectively. A vehicle speed V is calculated by averaging these wheel speeds and is outputted to the automatic mode control section 52 and the mode establishing section 54.

The automatic mode control section 52 inputs wheel speeds ωfl, ωfr, ωrl, ωrr of the wheels 14FL, 14FR, 14RL, 14RR from the wheel speed sensors 31FL, 31FR, 31RL, 31RR, respectively. Further, the automatic mode control section 52 inputs the lateral acceleration Gy from the lateral acceleration sensor 32, the braking signal from the braking switch 33, the vehicle speed V from the vehicle speed calculating section 51 and an output signal indicative of the calculation value from the mode establishing section 54.

The automatic mode control section 52 acts as automatic clutch control means and, more specifically, calculates target front-rear differential rotation speeds (target differential rotation speeds between front and rear drive shafts) Δωctrft, Δωctrrt which will be described hereinafter, a target front left-right differential rotation speed (target differential rotation speed between front left and front right wheels) ΔωFtt, and a target rear left-right differential rotation speed (target differential rotation speed between rear left and rear right wheels) ΔωRrt and calculates actual front-rear differential rotation speeds (actual differential rotation speeds between front and rear wheels) Δωctrf, Δωctrr, an actual front left-right differential rotation speed (actual differential rotation speed between front left and front right wheels) ΔωFt, and an actual rear left-right differential rotation speed (actual differential rotation speed between rear left and rear right wheels) ΔωRr. Then, those respective deviations εctrf, εctrr, εFt, εRr are calculated respectively. Further, a switching function being constituted using the polarity of the integral term of these deviations, a clutch torque Tlsdfb is calculated by applying the sliding mode control and further by taking a deviation proportional part into consideration. Thus calculated clutch torque Tlsdfb is outputted to the clutch torque calculating section 55 when the mode establishing section 54 inputs a command for outputting the calculation value.

Figure 3:
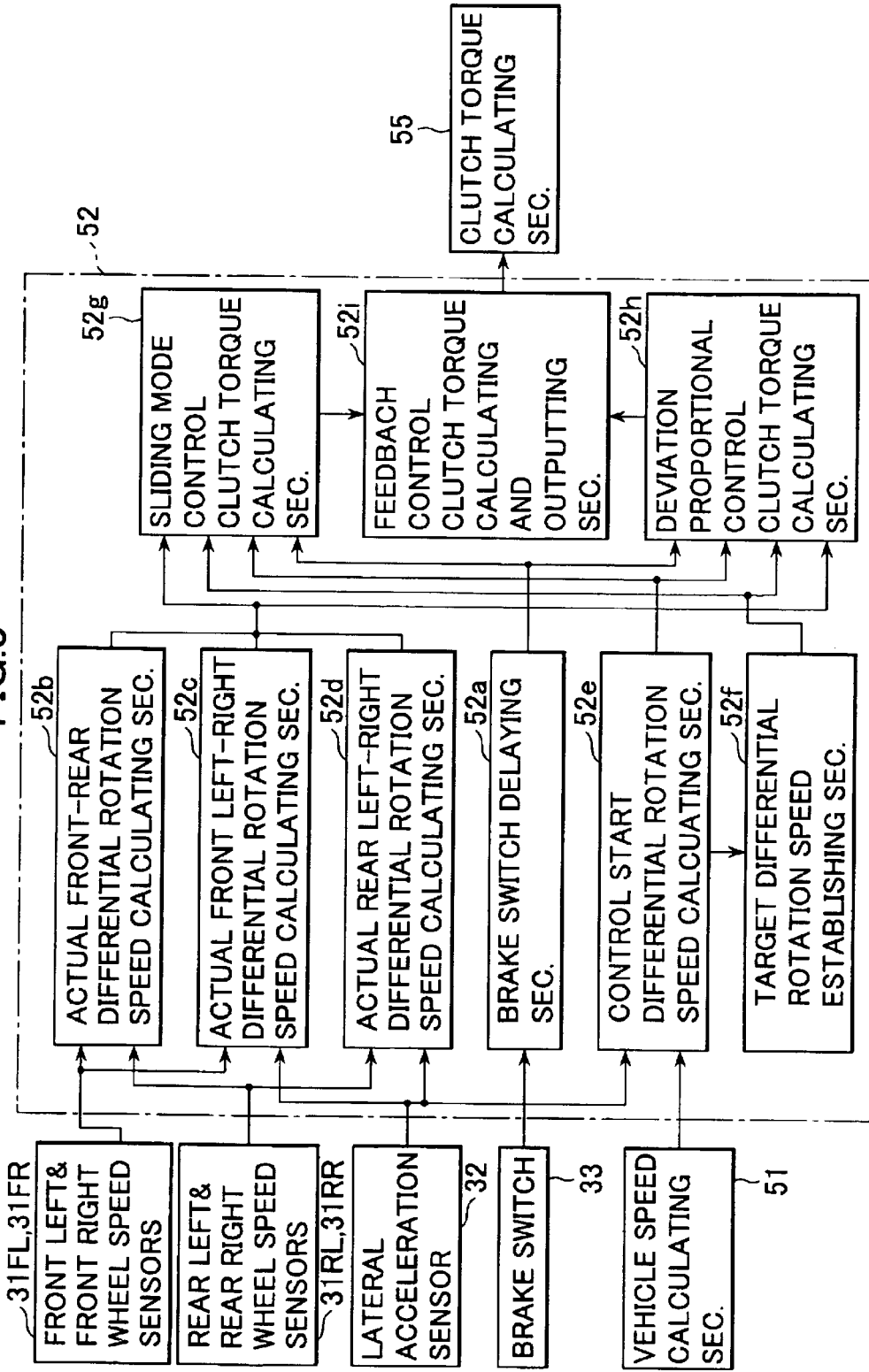
FIG. 3 is a functional block diagram of an automatic mode control section.

That is, as shown in FIG. 3, the automatic mode control section 52 is constituted by a brake switch delaying section 52a, an actual front-rear differential rotation speed calculating section 52b, an actual front left-right differential rotation speed calculating section 52c, an actual rear left-right differential rotation speed calculating section 52d, a control start differential rotation speed calculating section 52e, a target differential rotation speed establishing section 52f, a sliding mode control clutch torque calculating section 52g, a deviation proportional control clutch torque calculating section 52h, and a feedback control clutch torque calculating section 52i.

The brake switch delaying section 52a acts as delaying the timing for changing over the brake switch 33 from a turned-on condition to a turned-off condition for a specified short time. That is, when the brake switch 33 is changed over from a turned-on condition to a turned-off condition, the brake switch 33 is not turned off until the specified time elapses. Such a delaying process is not performed, when the brake switch 33 is changed over from a turned-off condition to a turned-on condition. After the specified time elapses, the brake switch 33 outputs an OFF signal to the sliding mode control clutch torque calculating section 52g and the deviation proportional control clutch torque calculating section 52h.

The actual front-rear differential rotation speed calculating section 52b inputs wheel speeds ωfl, ωfr, ωrl, ωrr of the wheels 14FL, 14FR, 14RL, 14RR from the wheel speed sensors 31FL, 31FR, 31RL, 31RR, respectively. Based on these wheel speeds, two kinds of the actual front-rear differential rotation speeds, Δωctrf, Δωctrr are calculated according to the following formulas (1) and (2):

$$\Delta\omega ctrf=((\omega fl+\omega fr)-(\omega rl+\omega rr))/2 \quad (1)$$

$$\Delta\omega ctrr=((\omega rl+\omega rr)-(\omega fl+\omega fr))/2 \quad (2)$$

In case where the rotation speed of the front drive shaft is faster than that of the rear drive shaft, Δωctrf is positive and Δωctrr is negative. On the other hand, in case where the rotation speed of the front drive shaft is slower than that of the rear drive shaft, Δωctrf is negative and Δωctrr is positive. Thus calculated actual front-rear differential rotation speeds Δωctrf, Δωctrr are outputted to the sliding mode control clutch torque calculating section 52g and the deviation proportional control clutch torque calculating section 52h. The reason why such two kinds of the actual front-rear differential rotation speeds are calculated is that the clutch torque is established such that the torque is transmitted from the drive shaft whose rotation speed is fast to the shaft whose rotation speed is slow by judging the positive or negative sign of the actual front-rear differential rotation speeds Δωctrf, Δωctrr.

The actual front left-right differential rotation speed calculating section 52c inputs the wheel speeds ωfl, ωfr of the front left and front right wheels 14FL, 14FR from the wheel speed sensors 31FL, 31FR of the front left and front right wheels 14FL, 14FR and further inputs the lateral acceleration Gy from the lateral acceleration sensor 32. An actual differential rotation speed ΔωFt between the front left wheel 14FL and the front right wheel 14FR is calculated according to either of the following formulas (3), (4) and (5):

$$\Delta\omega Ft=\omega fr-\omega fl \text{ (when turning right)} \quad (3)$$

$$\Delta\omega Ft=\omega fl-\omega fr \text{ (when turning left)} \quad (4)$$

$$\Delta\omega Ft=|\omega fr-\omega fl|\text{(when traveling straight)} \quad (5)$$

Then, the turning condition of the vehicle is judged from the lateral acceleration Gy. Further, when the absolute value |GY| is smaller than a preestablished value Ays, it is judged that the vehicle travels almost straightforward. In case where the lateral acceleration Gy is larger than the preestablished value Ays, it is judged that the vehicle turns left and in case where the lateral acceleration Gy is smaller than –Ays, it is judged that the vehicle turns right. The turning condition of the vehicle can be judged from a yaw rate, a steering angle and the like. When both left and right wheels have no wheel spin, the outer wheel rotates faster than the inner wheel, therefore, the actual differential rotation speed ΔωFt obtained from the formulas (3), (4) has a negative sign. Thus calculated actual differential rotation speed ΔωFt between the front left wheel 14FL and the front right wheel 14FR is outputted to the sliding mode control clutch torque calculating section 52g and the deviation proportional control clutch torque calculating section 52h, respectively.

The actual rear left-right differential rotation speed calculating section 52d inputs the wheel speeds ωrl, ωrr of the rear left and rear right wheels 14RL, 14RR from the wheel speed sensors 31RL, 31RR of the rear left and rear right wheels 14RL, 14RR and inputs the lateral acceleration Gy from the lateral acceleration sensor 32. An actual differential rotation speed ΔωRt between the rear left wheel 14RL and the rear right wheel 14RR is calculated according to either of the following formulas (6), (7) and (8):

$$\Delta\omega Rt=\omega rr-\omega rl \text{ (when turning right)} \quad (6)$$

$$\Delta\omega Rt=\omega rl-\omega rr \text{ (when turning left)} \quad (7)$$

$$\Delta\omega Rt=|\omega rr-\omega rl|\text{(when traveling straight)} \quad (8)$$

Then, the turning condition of the vehicle is judged from the lateral acceleration Gy. Further, when the absolute value |Gy| is smaller than a preestablished value Ays, it is judged that the vehicle travels almost straightforward. Similarly to the actual front left-right differential rotation speed calculating section 50e, when the lateral acceleration Gy is larger than the preestablished value Ays, it is judged that the vehicle turns left and when the lateral acceleration Gy is smaller than –Ays, it is judged that the vehicle turns right. The turning condition of the vehicle may be judged from a yaw rate, a steering angle and the like. When both left and right wheels have no wheel spin, the outer wheel rotates faster than the inner wheel, therefore, the actual differential rotation speed ΔωRt obtained from the formulas (6), (7) has a negative sign. Thus calculated actual differential rotation speed ΔωRt between the rear left wheel 14RL and the rear right wheel 14RR is outputted to the sliding mode control clutch torque calculating section 52g and the deviation proportional control clutch torque calculating section 52h, respectively.

The actual front-rear differential rotation speed calculating section 52b, the actual front left-right differential rotation speed calculating section 52c and the actual rear left-right differential rotation speed calculating section 52d function as actual differential rotation speed detecting means.

The control start differential rotation speed calculating section 52e inputs the lateral acceleration Gy from the lateral acceleration sensor 32 and the vehicle speed V from the vehicle speed calculating section 51, respectively. Further, a lower limit value of the actual differential rotation speed between front and rear drive shafts Δωctrfb, that is, a front-rear control start differential rotation speed (control start differential rotation speed between front and rear drive shafts) Δωctrfs is established according to the vehicle speed V and the lateral acceleration Gy by reference to a preestablished table. Similarly, a lower limit value of the actual differential rotation speed Δωctrr between front and rear shafts, that is, a front-rear control start differential rotation speed (control start differential rotation speed between front and rear drive shafts) Δωctrrs is established according to the vehicle speed V and the lateral acceleration Gy by reference to a preestablished table. Further, a lower limit of the actual differential rotation speed ΔωFt between the front left wheel 14FL and the front right wheel 14FR, that is, a control start front left-right differential rotation speed ΔωFts is established to a constant value CFts. Similarly, a lower limit of the actual differential rotation speed ΔωRt between the rear left wheel 14RL and the rear right wheel 14RR, that is, a control start rear left-right differential rotation speed ΔωRrs is established to a constant value CRrs.

Figure 4:
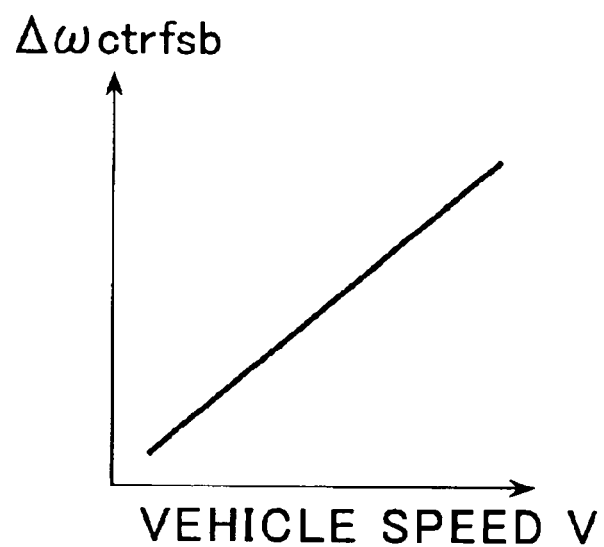
FIG. 4 is an explanatory diagram of an example of a table showing a relationship between a vehicle speed and a control start differential rotation speed.
Figure 5:
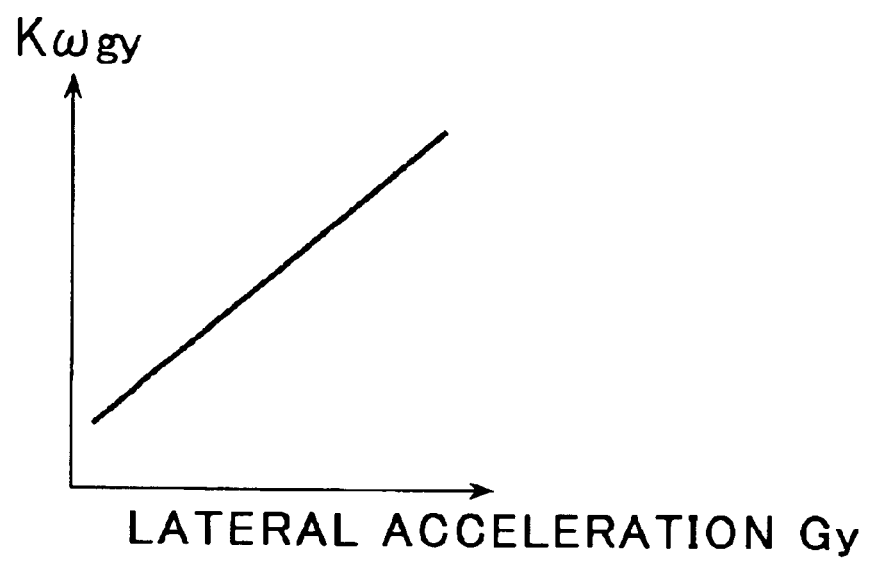
FIG. 5 is an explanatory diagram of an example of a table showing a relationship between a lateral acceleration and a correction coefficient of the control start differential rotation speed.

In establishing the aforesaid front-rear control start differential rotation speed Δωctrfs, first, as shown in FIG. 4, a basic value Δωctrfsb of the front-rear control start differential rotation speed Δωctrfs is established based on the present vehicle speed V by referring to a basic table of the front-rear control start differential rotation speed Δωctrfs versus the vehicle speed V. Further, as shown in FIG. 5, a correction coefficient kωgy of the front-rear control start differential rotation speed Δωctrfs is obtained based on the present lateral acceleration Gy from a correction coefficient table showing the relationship of the front-rear control start differential rotation speed Δωcoctrfs versus the lateral acceleration Gy. Then, the basic front-rear control start differential rotation speed Δωctrfsb is multiplied by the correction coefficient kωgy to obtain a final front-rear control start differential rotation speed Δωctrfs (=Δωctrfsb·kωgy).

According to a table of FIG. 4, the front-rear control start differential rotation speed Δωctrfs is established to be larger with an increase of the vehicle speed V. This is why the engagement force of the clutch is alleviated at high speeds for the purpose of improving fuel economy. Further, according to a table of FIG. 5, the front-rear control start differential rotation speed Δωctrfs is established to be larger with an increase of the lateral acceleration Gy. This is why the engagement force of the clutch is alleviated at high speeds to enhance the turning ability of the vehicle.

The front-rear control start differential rotation speed Δωctrrs is established in the same manner as the front-rear control start differential rotation speed Δωctrfs.

As will be described hereinafter, these respective control start differential rotation speeds Δωctrfs, Δωctrrs, ΔωFts and ΔωRrs are threshold values for starting the differential limiting control between the front and rear shafts, between the front left and front right wheels and between the rear left and rear right wheels. In case where the actual differential rotation speeds Δωctrf, Δωctrr, ΔωFt and ΔωRr are smaller than the control start differential rotation speeds Δωctrfs, Δωctrrs, ΔωFts and ΔωRrs, the engagement torque of the transfer clutch 21 is established to 0. In particular, in case where the front-rear differential rotation speed actually controlled becomes so small that miscellaneous troubles such as sticking of the transfer clutch 21 in a static friction condition, delaying the convergence of the control due to the transfer clutch 21 in a slip-lock condition or exacerbating the control stability, are caused. Further, in case where the control start differential rotation speeds ΔωFts, ΔωRrs between the front left and front right wheel or between the rear left and rear right wheel are set to 0 for example, when the wheel speed of the inner wheel is greater than that of the outer wheel, immediately the differential limiting control of the center differential is carried out.

In this embodiment, the control start front-rear differential rotation speeds Δωctrfs, Δωctrrs is established according to the vehicle speed V and the lateral acceleration Gy, however, those may be established according to a torque inputted to the center differential 3 (center differential input torque). Further, the control start front-rear differential rotation speeds Δωctrfs, Δωctrrs may be selectively variable according to a driver's intention.

Further, according to this embodiment, the control start front left-right differential rotation speed ΔωFts and the control start rear left-right differential rotation speed ΔωRrs are established to the constant value, however, those may be variably established according to parameters showing vehicle behaviors.

Thus calculated control start differential rotation speeds Δωctrfs, Δωctrrs, ΔωFts, ΔωRrs are outputted to the target differential rotation speed establishing section 52f, the sliding mode control clutch torque calculating section 52g and the deviation proportional control clutch torque calculating section 52h, respectively.

The target differential rotation speed establishing section 52f inputs the respective control start differential rotation speeds Δωctrfs, Δωctrrs, ΔωFts, ΔωRrs from the control start differential rotation speed calculating section 52e and calculates target front-rear differential rotation speeds Δωctrft, Δωctrrt, a target front differential rotation speed ΔωFtt, a target rear differential rotation speed ΔωRrt according to the following formulas (9), (10), (11), (12):

$$\Delta\omega ctrft = \Delta\omega ctrfs + Cctrft \quad (9)$$

$$\Delta\omega ctrrt = \Delta\omega ctrrs + Cctrrt \quad (10)$$

$$\Delta\omega Ftt = \Delta\omega Fts + CFtt \quad (11)$$

$$\Delta\omega Rrt = \Delta\omega Rrs + CRrt \quad (12)$$

where Cctrft, Cctrrt, CFtt, CRrt are constants established beforehand based on calculations, experiments and the like. Thus calculated target differential rotation speeds, Δωctrft, Δωctrrt, ΔωFtt, ΔωRrt are outputted to the sliding mode control clutch torque calculating section 52g and the deviation proportional control clutch torque calculating section 52h. Thus, the control start differential rotation speed calculating section 52e and the target differential rotation speed establishing section 52f serve as target differential rotation speed establishing means in the automatic clutch control means.

The sliding mode control clutch torque calculating section 52g inputs the brake signal processed by the brake switch delaying section 52a, the actual differential rotation speeds between the front and rear drive shafts Δωctrf, Δωctrrt from the actual front-rear differential rotation speed calculating section 52b, the actual differential rotation speed ΔωFt between the front left wheel 14FL and the front right wheel 14FR from the actual front left-right differential rotation speed calculating section 52c, the actual differential rotation speed ΔωRr between the rear left wheel 14RL and the rear right wheel 14RR from the actual rear left-right differential rotation speed calculating section 52d, the respective control start differential rotation speeds Δωctrfs, Δωctrrs, ΔωFts, ΔωRrs from the control start differential rotation speed establishing section 52e, and the respective target differential rotation speeds Δωctrft, Δωctrrt, ΔωFtt, ΔωRrt from the target differential rotation speed establishing section 52f. Further, the sliding mode control clutch torque calculating section 52g calculates the deviations of the respective rotation speeds between the target differential rotation speeds and the actual differential rotation speeds. Then, the sliding mode control clutch torque calculating section 52g constituting a switching function using the polarity of the integral term of these deviations, calculates the clutch torque of the transfer clutch 21 by applying the sliding mode control.

The deviations of the respective rotation speeds between the target differential rotation speeds and the actual differential rotation speeds are calculated as follows:

$$\epsilon ctrf = \Delta\omega ctrf - \Delta\omega ctrft \quad (13)$$

$$\epsilon ctrr = \Delta\omega ctrr - \Delta\omega ctrrt \quad (14)$$

$$\epsilon Ft = \Delta\omega Ft - \Delta\omega Ftt \quad (15)$$

$$\epsilon Rr = \Delta\omega Rr - \Delta\omega Rrt \quad (16)$$

where $\epsilon ctrf$ is a differential rotation speed deviation between front and rear drive shafts; $\epsilon ctrr$ is a differential rotation speed deviation between front and rear drive shafts; $\epsilon Ft$ is a differential rotation speed deviation between front left and front right wheels; and $\epsilon Rr$ is a differential rotation speed deviation between rear left and rear right wheels.

Further, the clutch torques TSMCctrf, TSMCctrr, TSMCFt, TSMCRr to be exerted on the transfer clutch 21 by the sliding mode control for each rotation speed are calculated using the following changing functions (17), (20), (23), (26).

First, the establishment of the clutch torque TSMCctrf using the differential rotation speed deviation between front and rear drive shafts $\epsilon ctrf$ by the sliding mode will be described.

$$TSMCctrf = s\ a\ t\ (xctrf) \quad (17)$$

where, in case of xctrf>0, TSMCctrf=s a t (xctrf)=xctrf; in case of xctrf≦0, TSMCctrf=s a t (xctrf)=0;

$$xctrf = kwctrf \cdot Jw \cdot (d\epsilon ctrf/dt) + Tsg \cdot (sctrf/(|sctrf|+\delta)) \quad (18)$$

$$\text{where } sctrf = \epsilon ctrf + ki \cdot \int (\epsilon ctrf) dt \quad (19)$$

(limits of integral is from 0 to t);
kwctrf is a differential term gain and in case of (dεctrf/dt)>0 is kwu and in case of (dεctrf/dt)≦0, is kwd; Jw is an inertia term; Tsg is a changing gain; δ is a constant for preventing chatterings; and ki is an integral term gain.

In case where the actual differential rotation speed Δωctrf becomes smaller than the control start differential rotation speed Δωctrfs, the transfer clutch 21 is engaged in a static friction condition due to the too small differential rotation speed and as a result the control of the transfer clutch 21 enters into a slip-lock condition. To prevent this exacerbated control stability, the clutch torque TSMCctrf is established to 0. Further, the integral is reset ($\int(\epsilon ctrf)dt$ is established to 0). Further, in case where the brake ON signal is inputted, similarly, the clutch torque TSMCctrf is established to 0 in order to prevent the interference with the braking condition and also the integral is reset.

Next, the establishment of the clutch torque TSMCctrr using the differential rotation speed deviation between front and rear drive shafts $\epsilon ctrr$ by the sliding mode will be described.

$$TSMCctrr = s\ a\ t\ (xctr) \quad (20)$$

where, in case of xctrr>0, TSMCctrr=s a t (xctrr)=xctrr; in case of xctrr≦0, TSMCctrr=s a t (xctrr)=0;

$$xctrr = kwctrr \cdot Jw \cdot (d\epsilon ctrr/dt) + Tsg \cdot (sctrr/(|sctrr|+\delta)) \quad (21)$$

$$\text{where } sctrr = \epsilon ctrr + ki \cdot \int (\epsilon ctrr) dt \quad (22)$$

(limits of integral is from 0 to t);
kwctrr is a differential term gain and in case of (dεctrr/dt)>0 is kwu and in case of (dεctrr/dt)≦0, is kwd; Jw is an inertia term; Tsg is a changing gain; δ is a constant for preventing chatterings; and ki is an integral term gain.

In case where the actual differential rotation speed Δωctrr becomes smaller than the control start differential rotation speed Δωctrrs, the transfer clutch 21 is engaged in a static friction condition due to the too small differential rotation speed and as a result the control of the transfer clutch 21 enters into a slip-lock condition. To prevent this exacerbated control stability, the clutch torque TSMCctrr is established to 0. Further, the integral is reset ($\int(\epsilon ctrr)dt$ is established to 0). Further, in case where the brake ON signal is inputted, similarly, the clutch torque TSMCctrr is established to 0 in order to prevent the interference with the braking condition and also the integral is reset.

Then, the establishment of the clutch torque TSMCFt using the differential rotation speed deviation between front left and front right wheels $\epsilon Ft$ by the sliding mode will be described.

$$TSMCFt = s\ a\ t\ (xFt) \quad (23)$$

where, in case of xFt>0, TSMCFt=s a t (xFt)=xFt; in case of xFt≦0, TSMCFt=s a t (xFt)=0;

$$xFt = kwFt \cdot Jw \cdot (d\epsilon Ft/dt) + Tsg \cdot (sFt/(|sFt|+\delta)) \quad (24)$$

$$\text{where } sFt = \epsilon Ft + ki \cdot \int (\epsilon Ft) dt \quad (25)$$

(limits of integral is from 0 to t);
kwFt is a differential term gain and in case of (dεFt/dt)>0 is kwu and in case of (dεFt/dt)≦0, is kwd; Jw is an inertia term; Tsg is a changing gain; δ is a constant for preventing chatterings; and ki is an integral term gain.

In case where the actual differential rotation speed between front left and front right wheels ΔωFt becomes smaller than the control start differential rotation speed ΔωFts, it is judged that the control of the front differential clutch 27 is effective and the clutch torque TSMCFt of the transfer clutch 21 is established to 0 to prevent the interference between the front differential 27 and the transfer clutch 21. Further, the integral is reset ($\int(\epsilon Ft)dt$ is established to 0). Further, in case where the brake ON signal is inputted, similarly, the clutch torque TSMCFt is established to 0 in order to prevent the interference with the braking condition and also the integral is reset.

Then, the establishment of the clutch torque TSMCRr using the differential rotation speed deviation between rear left and rear right wheels $\epsilon$Rr by the sliding mode will be described.

$$TSMCRr = s\ a\ t\ (xRr) \tag{26}$$

where, in case of xRr>0, TSMCRr=s a t (xRr)=xRr; in case of xRR$\leq$0, TSMCRr=s a t (xRr)=0;

$$xRr = kwRr \cdot Jw \cdot (d\epsilon Rr/dt) + Tsg \cdot (sRr/(|sRr|+\delta)) \tag{27}$$

$$\text{where } sRr = \epsilon Rr + ki \cdot \int (\epsilon Rr) dt \tag{28}$$

(limits of integral is from 0 to t);
kwRr is a differential term gain and, in case of (d$\epsilon$Rr/dt)>0, is kwu and, in case of (d$\epsilon$Rr/dt)$\leq$0, is kwd; Jw is an inertia term; Tsg is a changing gain; $\delta$ is a constant for preventing chatterings; and ki is an integral term gain.

In case where the actual differential rotation speed between rear left and rear right wheels $\Delta\omega$Rr becomes smaller than the control start differential rotation speed $\Delta\omega$Rrs, it is judged that the control of the front differential clutch 27 is effective and the clutch torque TSMCRr of the transfer clutch 21 is established to 0 to prevent the interference between the front differential 27 and the transfer clutch 21. Further, the integral is reset ($\int(\epsilon Rr)dt$ is established to 0). Further, in case where the brake ON signal is inputted, similarly, the clutch torque TSMCRr is established to 0 in order to prevent the interference with the braking condition and also the integral is reset.

Thus, according to the sliding mode control in the embodiment, the switching function is formed using the polarity of the integral term of deviation. That is, in the switching function (18), the integral term of deviation sctrf is divided by (|sctrf|+$\delta$) to obtain the polarity of the integral term and in the changing function (21), the integral term of deviation sctrr is divided by (|sctrr|+$\delta$) to obtain the polarity of the integral term, in the changing function (24), the integral term of deviation sFt is divided by (|sFt|+$\delta$) to obtain the polarity of the integral term, and in the changing function (27), the integral term of deviation sRr is divided by (|sRr|+$\delta$) to obtain the polarity of the integral term. In these cases, $\delta$ is a value for preventing the division by 0. Hence, even in case where the respective integral terms are small, since the clutch torque is established by applying the integral terms to the sliding mode control, the control according to the present invention provides a traction performance with accurate and quick responsibility.

The respective clutch torques TSMCctrf, TSMCctrr, TSMCFt, TSMCRr thus calculated in the sliding mode control clutch torque calculating section 52g are outputted to the feedback control clutch torque calculating section 52i.

The deviation proportional control clutch torque calculating section 52h inputs the brake signal processed in the brake switch delaying section 52a, the actual differential rotation speed between front and rear drive shafts $\Delta\omega$ctrf, $\Delta\omega$ctrr from the actual front-rear rotation speed calculating section 52b, the actual differential rotation speed between the front left wheel 14FL and the front right wheel 14FR differential rotation speed $\Delta\omega$Ft from the actual front left-right differential rotation speed calculating section 52c, the actual differential rotation speed between the rear left wheel 14RL and the rear right wheel 14RR differential rotation speed $\Delta\omega$Rr from the actual rear left-right differential rotation speed calculating section 52d, the respective control start differential rotation speeds $\Delta\omega$ctrfs, $\Delta\omega$ctrrs, $\Delta\omega$Fts, $\Delta\omega$Rrs from the control start differential rotation speed establishing section 52e, and the respective target differential rotation speeds $\Delta\omega$ctrft, $\Delta\omega$ctrrt, $\Delta\omega$Ftt, $\Delta\omega$Rrt from the target differential rotation speed establishing section 52f. Further, this deviation proportional control clutch torque calculating section 52h calculates the deviation between the target differential rotation speed and the actual differential rotation speed for respective rotation speeds as will be described hereinafter and obtains proportional components of the clutch torques for converging the actual differential rotation speed upon the target differential rotation speed as follows (clutch torques Tpcctrf, Tpcctrr, TpcFt, TpcRr).

That is, the deviation between the target differential rotation speed and the actual differential rotation speed for the respective rotation speeds is calculated as follows:

$$\epsilon pctrf = \Delta\omega ctrf - \Delta\omega ctrft - (\Delta\omega ctrft - \Delta\omega ctrfs) \tag{29}$$

$$\epsilon pctrr = \Delta\omega ctrr - \Delta\omega ctrrt - (\Delta\omega ctrrt - \Delta\omega ctrrs) \tag{30}$$

$$\epsilon pFt = \Delta\omega Ft - \Delta\omega Ftt - (\Delta\omega Ftt - \Delta\omega Fts) \tag{31}$$

$$\epsilon pRr = \Delta\omega Rr - \Delta\omega Rrt - (\Delta\omega Rrt - \Delta\omega Rrs) \tag{32}$$

where $\epsilon$pctrf is a differential rotation speed deviation between front and rear drive shafts; $\epsilon$pctrr is a differential rotation speed deviation between front and rear drive shafts; $\epsilon$pFt is a differential rotation speed deviation between front left and front right wheels; and $\epsilon$pRr is a differential rotation speed deviation between rear left and rear right wheels.

The clutch torques Tpcctrf, Tpcctrr, TpcFt, TpcRr based on the deviation proportional control are calculated respectively as follows:

First, the clutch torque Tpcctrf based on the deviation proportional control using the differential rotation speed deviation between front and rear shafts $\epsilon$pctrf is, in case of $\epsilon$pctrf>0, Tpcctrf=kp1·$\epsilon$pctrf+kp2·$\Delta\omega$ctrf in case of $\epsilon$pctrf$\leq$0, Tpcctrf=kp2·$\Delta\omega$ctrf.

Next, the clutch torque Tpcctrr based on the deviation proportional control using the differential rotation speed deviation between front and rear shafts $\epsilon$pctrr is, in case of $\epsilon$pctrr>0, Tpcctrr=kp1·$\epsilon$pctrr+kp2·$\Delta\omega$ctrr in case of $\epsilon$pctrr$\leq$0, Tpcctrr=kp2·$\Delta\omega$ctrr.

Next, the clutch torque TpcFt based on the deviation proportional control using the differential rotation speed deviation between front left and front right $\epsilon$pFt is, in case of $\epsilon$pFt>0, TpcFt=kp1·$\epsilon$pcFt+$\Delta\omega$cFt in case of $\epsilon$pFt$\leq$0, TpcFt=$\Delta\omega$Ft.

Next, the clutch torque TpcRr based on the deviation proportional control using the differential rotation speed deviation between rear left and rear right $\epsilon$pRr is, in case of $\epsilon$pRr>0, TpcRr=kp1·$\epsilon$pcRr+$\Delta\omega$cRr in case of $\epsilon$pRr$\leq$0, TpcRr=$\Delta\omega$Rr.

where kp1 is a first proportional term gain; kp2 is a second proportional term gain; $\epsilon$ctrf is a differential rotation speed deviation between front and rear drive shafts; $\epsilon$ctrr is a differential rotation speed deviation between front and rear drive shafts; $\epsilon$Ft is a differential rotation speed deviation between front left and front right wheels; and $\epsilon$Rr is a differential rotation speed deviation between rear left and rear right wheels.

Further, when the ON signal of the brake switch is inputted, the aforesaid clutch torques Tpcctrf, Tpcctrr, TpcFt, TpcRr based on the deviation proportional control are established to 0 to avoid the interference with the braking condition, respectively.

The clutch torques Tpcctrf, Tpcctrr, TpcFt, TpcRr calculated in the deviation proportional control clutch torque calculating section 50*j* are outputted to the feedback control clutch torque calculating and outputting section 52*i*, respectively.

The feedback control clutch torque calculating and outputting section 52*i* inputs the respective clutch torques TSMCctrf, TSMCctrr, TSMCFt, TSMCRr from the sliding mode control clutch torque calculating section 52*g* and the respective clutch torques Tpcctrf, Tpcctrr, TpcFt, TpcRr from the deviation proportional control clutch torque calculating section 52*h*.

Then, four clutch torques Tctrf, Tctrr, TFt, TRr are obtained by the summation respectively and a largest one of the clutch torques is established to be a final clutch torque Tlsdfb to be applied to the transfer clutch 21. When an execution command is issued from the mode establishing section 54, this clutch torque Tlsdfb is outputted to the clutch torque calculating section 55.

That is, $Tctrf=TSMCctrf+Tpcctrf$ $Tctrr=TSMCctrr+Tpcctrr$ $TFt=TSMCFt+TpcFt$ $TRr=TSMCRr+TpcRr$ $$Tlsdfb=\text{MAX}(Tctrf, Tctrr, TFt, TRr) \tag{33}$$

Thus, the sliding mode control clutch torque calculating section 52*g*, the deviation proportional control clutch torque calculating section 52*b* and the feedback control clutch torque calculating and outputting section 52*i*, serve as clutch torque calculating and outputting means in the automatic clutch control means.

On the other hand, as shown in FIG. 2, the manual mode control section 53 inputs a signal indicative of the dial position from the characteristic changing dial 36 and a signal indicative of an output execution command from the mode establishing section 54.

The manual mode control section 53 acts as manual clutch control means in which, when the output execution command of the calculated value is inputted from the mode establishing section 54, a clutch torque Tlsdh corresponding to the dial position selected by the driver of the characteristic changing dial 36 is outputted to the clutch torque calculating section 55.

The mode establishing section 54 serving as control selecting means inputs an ON-OFF signal of the ignition switch 34, a signal indicative of the selection of the power distribution control mode (automatic mode or manual mode) from the mode switch 35 and the vehicle speed V from the vehicle speed calculating section 51.

Further, the mode establishing section 54 outputs an output execution command of calculated values to the automatic mode calculating section 52 or the manual mode control section 53 according to the signal from the mode switch 35. In the following two cases, the output execution command of the calculated values is issued to the automatic mode control section 52. The mode established in the mode establishing section 54 is indicated by the mode indicator lamp 37.

[Case 1] In an initial condition of the ignition switch 34 turned on, even in case where the manual mode is selected by the mode switch 35, the output execution command of the calculated values is outputted to the automatic mode control section 52 until the manual mode is newly selected by the mode switch 35. Accordingly, in case where a driver turns the ignition switch 35 off and leaves the car while the manual mode is selected, when the car starts next, the automatic mode is designed to be securely selected so as to obtain an optimum clutch torque.

[Case II] In case where the vehicle travels at a speed exceeding a threshold value VH (for example, 50 km/hour), even if the manual mode is selected by the mode switch 35, the output execution command of the calculated values is outputted to the automatic mode control section 52 and the automatic mode is selected. This is because it is judged that the optimum clutch engagement force is difficult to be obtained in the manual mode condition under such a high speed condition.

The clutch torque calculating section 55 inputs the ON-OFF signal from the brake switch 33, the ON-OFF signal from the ABS control apparatus 38, the clutch torque Tlsdfb from the automatic mode control section 52 (when the output execution command is issued from the mode establishing section 54), and the clutch torque Tlsdh from the manual mode control section 53 (when the output execution command is issued from the mode establishing section 54), respectively.

These inputted clutch torques Tlsdfb or Tlsdh are converted into a signal of a clutch torque Tlsd and outputted to the center differential drive section 60.

When a turned-on signal is inputted from the ABS control apparatus 38, that is, when there is a signal indicating that the ABS is operative, the clutch torque Tlsd is established to a predetermined constant value CABS in order to prevent the interference with the ABS control. Similarly, when a turned-on signal is inputted from the brake switch 33, the clutch torque Tlsd is established to a predetermined constant value Cbrk in order to prevent the interference with the braking condition.

Next, the front-rear power distribution control of the differential limiting section 50 will be described by referring to a flowchart of FIG. 6. This flowchart is a flowchart which will be executed at a specified time interval when the ignition switch 34 is turned on. First, at S101, parameters are read and then at S102 it is judged whether or not the ignition switch 34 is still in a turned-on condition.

In case where it is judged at S102 that the ignition switch 34 is turned on, the program again returns to S101, and in case where it is judged that the ignition switch 34 is turned off, the program goes to S103.

At S103, it is judged whether or not a signal is inputted from the mode switch 35. In case where no signal is inputted, the program goes to S104 where the front-rear power distribution control is established to the automatic mode and the mode indicator lamp 37 indicates the automatic mode.

Then, the program goes to S105 where the mode establishing section 54 outputs the output execution command of the calculated values to the automatic mode control section 52 and the clutch torque Tlsdfb calculated in the automatic mode control section 52 is outputted to the clutch torque calculating section 55. The clutch torque calculating section 55 outputs the inputted clutch torque Tlsdfb according to the ON-OFF conditions of the brake switch 33 or the ABS control apparatus 38.

On the other hand, at S103, in case where the signal is inputted from the mode switch 35, the program goes to S106 where it is judged whether or not the front-rear power distribution control selected by the mode switch 35 is the manual mode. As a result of the judgment, if the power distribution control selected is not the manual mode, it must be the automatic mode and the program goes to S104. If it is the manual mode, the program goes to S107.

At S107, it is judged whether or not the present vehicle speed V exceeds the preestablished threshold value VH, for example 50 km/hour, (V>VH). In case of V>VH, it is judged that an optimum clutch torque is difficult to be obtained with the clutch torque established by the driver and the program goes to S104 where the front-rear power distribution control is established to the automatic mode.

In case where the present vehicle speed is lower than the threshold value VH (V≦VH), the program goes to S108 where the front-rear power distribution control is established to the manual mode and the mode indicator lamp 37 indicates as such.

Then, the program goes to S109 where the mode establishing section 54 outputs the output execution command of the clutch torque established by the driver to the manual mode control section 53. The manual mode control section 53 outputs the clutch torque Tlsdh to the clutch torque calculating section 55, from which the inputted clutch torque Tlsdh is outputted according to the ON-OFF conditions of the ABS control apparatus 38 or the brake switch 33.

According to the embodiment of the present invention, when the ignition switch 34 is at an initial stage of a turned-on condition, the front-rear power distribution control is designed to be established to the automatic mode until the manual mode is newly selected by the mode switch 35. Hence, in case where the driver turns the ignition switch 35 off with the manual mode selected and leaves the vehicle, when the driver starts the vehicle next, the automatic mode is securely selected. As a result, even in case where the driver starts the vehicle inadvertently with the manual mode, the automatic mode is automatically selected and as a result such an unexpected vehicle behavior as the vehicle encounters spin conditions on a road surface with low friction coefficient, can be prevented. Further, according to the embodiment of the present invention, since the power distribution control is forcedly established to the automatic mode when the vehicle speed V exceeds the threshold value VH, always the optimum clutch torque can be obtained. This prevents the vehicle behavior from becoming unstable due to unsuitable clutch torques selected by the manual mode. Further, since the power distribution control enters into the automatic mode automatically when the vehicle speed exceeds the threshold value, for example 50 km/hour, the fuel economy is prevented from being exacerbated by a long time engagement of the transfer clutch 21.

The entire contents of Japanese Patent Application No. Tokugan 2002-311568 filed Oct. 25, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A differential limiting control apparatus for a four wheel drive vehicle having clutch means for variably transmitting a driving force to a front drive shaft and to a rear drive shaft, comprising:
    automatic clutch control means for automatically calculating and establishing an engagement force of said clutch means according to traveling conditions of said vehicle;
    manual clutch control means for manually establishing said engagement force of said clutch means; and
    control selecting means for selecting either of said automatic clutch control means and said manual clutch control means and for commanding said selected one to output said engagement force.

2. The differential limiting control apparatus according to claim 1, wherein, in an initial condition of an ignition switch turned on, said control selecting means commands said automatic clutch control means to output said engagement force of said clutch means until said manual clutch control means is newly selected.

3. The differential limiting control apparatus according to claim 1, wherein, when said vehicle travels at a higher speed than a threshold value, said control selecting means commands said automatic clutch control means to output said engagement force of said clutch means.

4. The differential limiting control apparatus according to claim 1, wherein said automatic clutch control means includes target differential rotation speed establishing means for establishing a target differential rotation speed between said front and rear drive shafts, actual differential rotation speed detecting means for detecting an actual differential rotation speed between said front and rear drive shafts, and clutch torque calculating and establishing means for obtaining deviations between said target differential rotation speed and said actual differential rotation speed and for calculating and establishing said engagement force of said clutch means by constituting a switching function using the polarity of an integral term of said deviations and by applying the sliding mode control.

5. A differential limiting controller for a four wheel drive vehicle having a clutch that variably transmits a driving force to a front drive shaft and to a rear drive shaft, comprising:
    an automatic clutch controller that calculates an engagement force of said clutch;
    a manual clutch controller for manually controlling said engagement force of said clutch; and
    a controller selector that selects one of said automatic clutch controller and said manual clutch controller.

6. The controller of claim 5, wherein said automatic clutch controller further establishes an engagement force of said clutch.

7. The controller of claim 6, wherein said automatic clutch controller establishes an engagement force of said clutch based upon said calculation of said engagement force.

8. The controller of claim 5, wherein said automatic clutch controller calculates said engagement force based upon traveling conditions of said vehicle.

9. The controller of claim 5, wherein said controller selector selects said automatic clutch controller in an initial condition of an ignition switch being turned on.

10. The controller of claim 9, further comprising a mode switch that indicates an operator preference of manual engagement of said clutch.

11. The controller of claim 10, wherein said controller selector selects said manual clutch controller when said mode switch indicates an operator preference for manual engagement of said clutch.

12. The controller of claim 5, wherein said controller selector selects said automatic clutch controller when the traveling speed of said vehicle exceeds a threshold speed.

13. The controller of claim 5, wherein said automatic clutch controller comprises a target differential rotation speed calculator that calculates a target differential rotation speed between said front drive shaft and said rear drive shaft.

14. The controller of claim 5, wherein said automatic clutch controller comprises an actual differential rotation speed detector that detects an actual differential rotation speed between said front and rear drive shafts.

15. The controller of claim 5, wherein said automatic clutch controller comprises a clutch torque calculator that calculates a clutch torque command.

16. The controller of claim 15, wherein said automatic clutch controller further comprises:
- a target differential rotation speed calculator that calculates a target differential rotation speed between said front drive shaft and said rear drive shaft; and
- an actual differential rotation speed detector that detects an actual differential rotation speed between said front and rear drive shafts, wherein said automatic clutch controller calculates said clutch torque command based upon deviations of said calculated target differential rotation speed and deviations of said detected actual differential rotation speed.

17. The controller of claim 16, wherein said automatic clutch controller calculates said clutch torque command based upon a sliding mode control of said deviations of said calculated target differential rotation speed and deviations of said detected actual differential rotation speed.

* * * * *